Oct. 21, 1952  R. M. GILE  2,614,455
FILM GATE FOR PROJECTION APPARATUS
Filed Sept. 7, 1951  2 SHEETS—SHEET 1

INVENTOR
RICHARD M. GILE
BY
ATTORNEYS

Oct. 21, 1952 R. M. GILE 2,614,455
FILM GATE FOR PROJECTION APPARATUS
Filed Sept. 7, 1951 2 SHEETS—SHEET 2

INVENTOR
RICHARD M. GILE
BY
ATTORNEYS

Patented Oct. 21, 1952

2,614,455

UNITED STATES PATENT OFFICE 2,614,455

FILM GATE FOR PROJECTION APPARATUS

Richard M. Gile, Buffalo, N. Y., assignor to American Optical Company, Southbridge, Mass., a voluntary association of Massachusetts Application September 7, 1951, Serial No. 245,620

5 Claims. (Cl. 88—17)

This invention relates to microfilm projection apparatus and the like; and more particularly to a film gate construction for use in such apparatus, which comprises a plurality of separable parts which may be made and assembled economically and which, when assembled, will provide exact positioning of strip film therein with respect to the curved object field of a projection objective of said apparatus as well as a guideway having exceedingly close tolerances for the strip film therein or being passed at various speeds therethrough.

Microfilm has become a common medium for recording in compact form printed matter, documentary evidence, etc., and since such film is not required to be transported across a projection aperture in a step-by-step manner in exact successive equal amounts, as is conventional motion picture film, unperforated film may be employed to advantage and use made of a greater amount of the film in the transverse dimension thereof for the individual frames or picture carrying areas thereon. The result is that in a 16 mm. microfilm, for example, as much as 15 mm. of the total width of the film is at times occupied by the picture bearing areas, with the result that sometimes no more than a half millimeter of clear film remains at either marginal edge of the film.

In microfilm readers provided with transparent pressure plates at the projection aperture for maintaining the individual frames or image bearing areas of the strip film in the focal plane of the objective, such narrow unused marginal portions are of minor concern. However, in a microfilm projector using such pressure plates considerable difficulty is experienced from the fact that the plates require expensive and cumbersome mechanical means for opening or separating the plates before the film starts to move and also for subsequent closing the plates after the film has assumed a completely stationary condition. Otherwise, the film might be irrepairably damaged. Also such pressure plates are liable to collect dust particles and other foreign matter, and have to be cleaned from time to time. Furthermore, at times foreign matter may become embedded in the plastic material of the microfilm and this may scratch the surfaces of the pressure plates as the film moves therebetween. Such scratches, it will be readily appreciated are very objectionable since they will lie substantially in the same plane as the picture upon the film and consequently will "fog" or diffuse the projected image.

For these and other reasons it has been found desirable to provide in microfilm projection apparatus, in place of pressure plates, a curved film gate which will prevent buckling of the film during projection and which accurately curves the film to a predetermined curvature which will most nearly fit the curvature of field of the objective of the apparatus. Such a microfilm projector employing a curve film gate is shown in prior Patent No. 2,482,666 which issued September 20, 1949.

While such a curved film gate at first glance might appear to be a comparatively simple device, it nevertheless has been found in practice to be a difficult thing to manufacture accurately to the several exacting tolerances required and still have some function as intended over long periods of time. For example, such a curved film gate must support the film accurately in a predetermined curvature according to the objective employed, must support the film at opposite edges in order to maintain such film curvature, such support means for the edges must be wear resistant and as smooth as possible, must be narrow in order to provide a maximum clear aperture therebetween, and must have confining walls outwardly thereof which have a very accurate width therebetween for guiding the film. Furthermore, the gate must not scratch the picture carrying area of the film. Also the gate must have a cover member but such cover member must normally closely confine the clear side edges of the film at the projection aperture while allowing free movement thereof. It must not contact the picture areas of the film and it should be free for movement away from the gate member for insertion of an intermediate portion of strip film while suspended between a pair of supporting reels. On the other hand, the cover member must not allow the film to move out of the guideway provided therefor while the film is traversing the projection aperture at high and variable speeds. Furthermore, at times a double thickness of film, such as a film splice, must be accommodated by the gate. Parts of the gate and cover members contacting the film must not only be accurately spaced to properly accommodate the film and splices therein, accurately curved to fit the predetermined requirements of the associated objective or objectives, but also should be, for best results and minimum friction, as smooth as possible and as hard as possible to withstand the repeated abrasive wear of the strip film sliding thereover, and of course it is desirable to have a gate possessing all of these advantages also be inexpensive to make and install. It has been found that a gate possessing these desirable features may be had by making same of several parts and assembling these parts in accordance with the teachings of the present invention.

It is, accordingly, an object of the present invention to provide for strip film projectors, or the like, a film gate construction comprising a pair of accurately spaced film guiding rails of small carefully controlled transverse dimension or thickness and curved to the exact predetermined curvature required for positioning film in the curved object field of a projection objective. It is also an object of the invention to make certain of the parts of such a film gate construction as separate elements so that they may be individually formed to exact predetermined dimensions and separately treated or processed as required before assembly, and also so that certain of said parts may be readily adjustable relative to other parts thereof for accurate positioning during the assembly of the gate.

It is an additional object of the invention to provide a film gate construction having a pair of film guiding rails which may be individually fabricated of material best suited for the purpose and individually treated, or a plurality thereof fabricated and processed, as desired, as a group before being assembled in individual film gate constructions.

It is a further object of the invention to provide in such a curved film gate having a normally stationary gate assembly and cover means therefor, a construction and arrangement of parts which allows film guiding surfaces thereof to be readily adjusted into exact predetermined spacing relative to film confining portions of the cover guide means, or readjusted readily to a different exact film thickness or spacing when required.

Other objects and advantages of the invention will become apparent from the detailed description which follows when taken in conjunction with the accompanying drawing in which.

Figure 1:
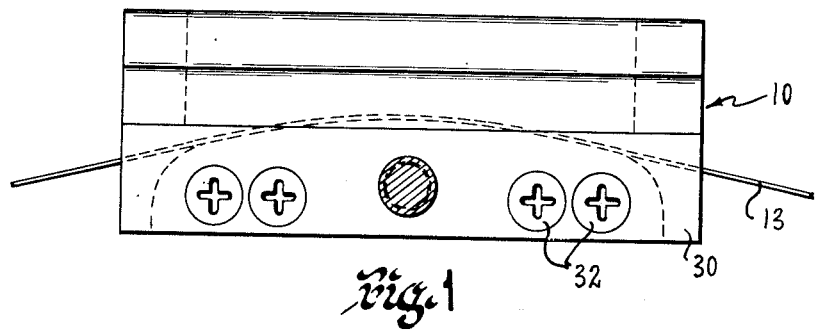
Fig. 1 is a front elevational view of a microfilm gate construction embodying the present invention and showing film extending therethrough.

Referring to the drawing in detail, there is shown in Figs. 1, 2, 3 and 4 a film gate construction 10 comprising a gate assembly 11 and a cover assembly 12. A strip of film extending through the gate is shown at 13. The gate assembly comprises a pair of spacing blocks 14 and 15 spaced from each other an amount sufficient to accommodate a rectangular projection aperture 16 therebetween. In fact it may be convenient to have the blocks actually define edges of the aperture, as in the present instance. The blocks 14 and 15 may be individually finished or a plurality grouped together and finished at one time upon opposite edges thereof so as to form upon each block a pair of abutment surfaces 18 and 19 which are an exact predetermined distance from each other. When a pair of these blocks properly drilled to receive securing screws or bolts are employed as spacer members a pair of guide rail members 20 and 22 may be clamped thereto. The guide rail members are of accurately controlled thickness and are provided along their upper edges with a pair of accurately curved upper surfaces 24 and 26, respectively, which serve as supporting means for marginal edge portions of strip film extending through the gate assembly. In order to maintain these guide rails in position in the assembly and to prevent lateral displacement of the film a pair of side bars 28 and 30 are provided and are clamped against the outer sides of the rails preferably by means of sets of screws or the like 32 extending therethrough and through the guide rails and threaded into opposite sides of each spacing block. Thus, facing side wall portions thereof may be made to accurately receive and laterally confine the film strip. It is preferable to provide such a set of four screws for each side bar and adjacent guide rail so that same may be individually secured in place. For reasons which will be later explained the openings provided in the guide rails 20 and 22 are made slightly oversized with respect to the size of the bolts or screws 32 employed for clamping the parts together and, accordingly, the position of each guide rail may be adjusted in a vertical or longitudinal direction slight amounts when required. Guide rails 20 and 22 in the present construction are recessed slightly as indicated at 20' and 22' so as not to block off edge portions of the picture forming light rays.

By providing a gate assembly composed of a plurality of parts, as just described, it is possible to exactly finish the opposite abutment surface 18 and 19 on the spacing blocks 14 and 15 accurately relative to each other, individually or in groups, and to employ therewith guide rails which may be formed of relatively hard sheet materials, such as tool steel or the like, and to heat treat same to provide any preferred microgranular condition. Also, it will be easy to grind and polish the film supporting edges thereof, individually or in groups, to an exact predetermined curvature or curvatures as required. Furthermore, it is possible to employ as the plate-like material from which these guide rail members are formed, either sheet metal of exactly the desired thickness or to individually accurately finish these plate-like members to such a thickness with little difficulty and by common machining methods.

Figure 6:
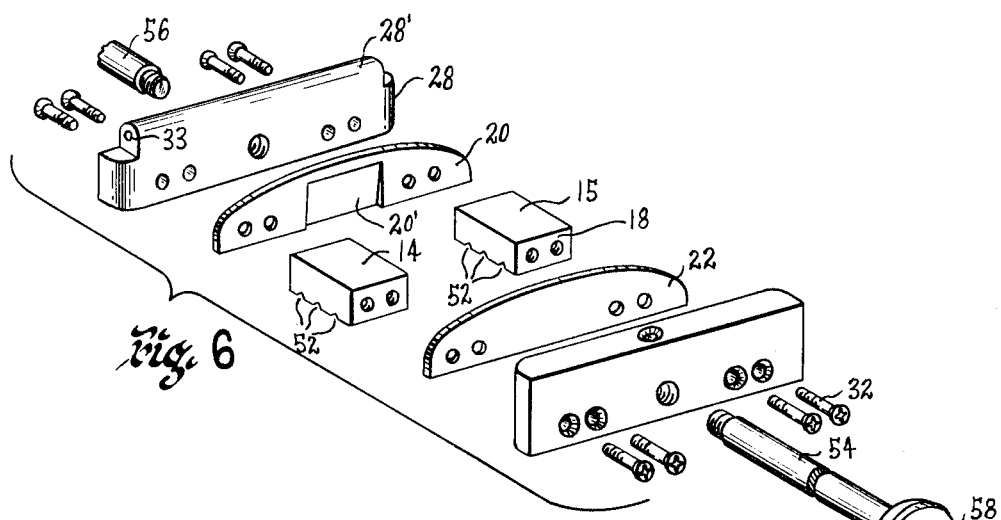
Fig. 6 is a perspective exploded view of the gate assembly in Fig. 1.
Figures 7, 8:
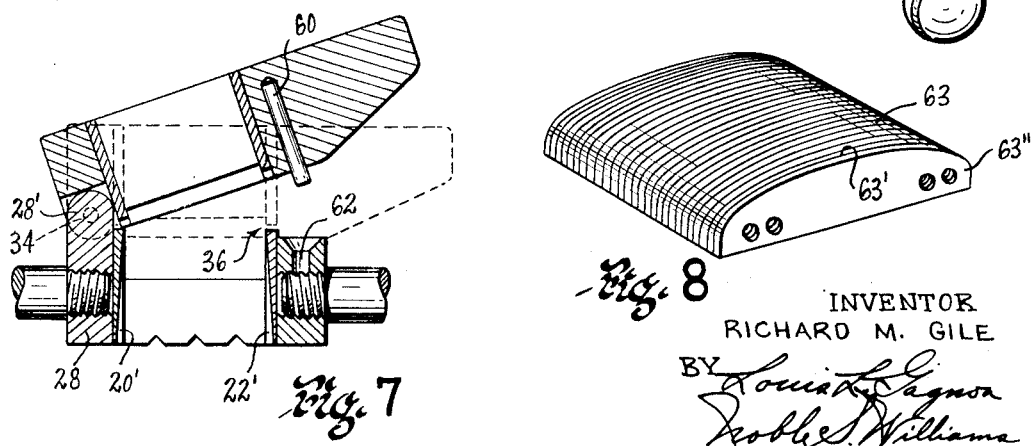
Fig. 7 is a sectional view taken substantially on section lines 7—7 of Fig. 3.
Fig. 8 is a perspective view of guide rails which may be used in the structure of Fig. 1.

The component parts of the gate assembly 11 are shown by an exploded view in Fig. 6 and it will be seen that the side bar 28 is provided with an upper extension 28' in which aligned threaded openings 33 are arranged adjacent opposite ends thereof for receiving a pair of pintles 34 upon which the cover assembly 12 may be hinged. As shown in Fig. 7 the cover assembly is arranged for movement from an operative position overlying film supported by the film gate assembly to a raised or inoperative position for allowing such film to be inserted or removed as desired from a passageway or guideway 36 formed therebetween.

Figure 2:
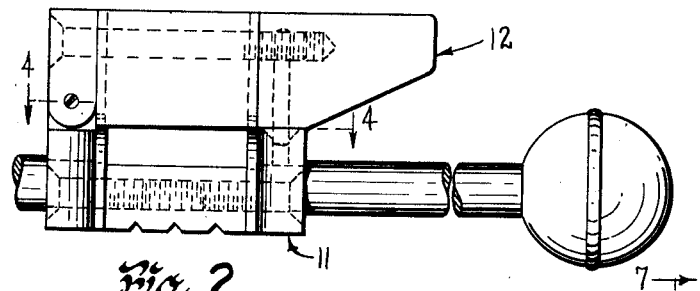
Fig. 2 is a side elevational view of the structure of Fig. 1 and showing a handle for bodily shifting the gate.
Figure 3:
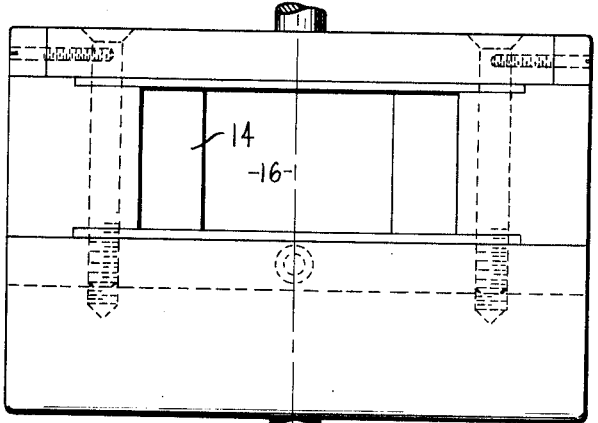
Fig. 3 is a plan view of the structure of Fig. 1.
Figure 4:
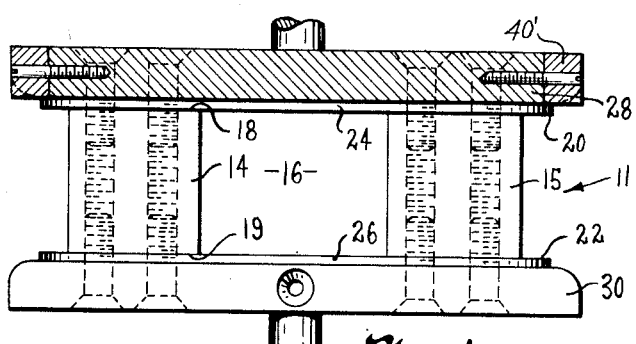
Fig. 4 is a plan view, partly in section, of the gate assembly of Fig. 1.
Figure 5:
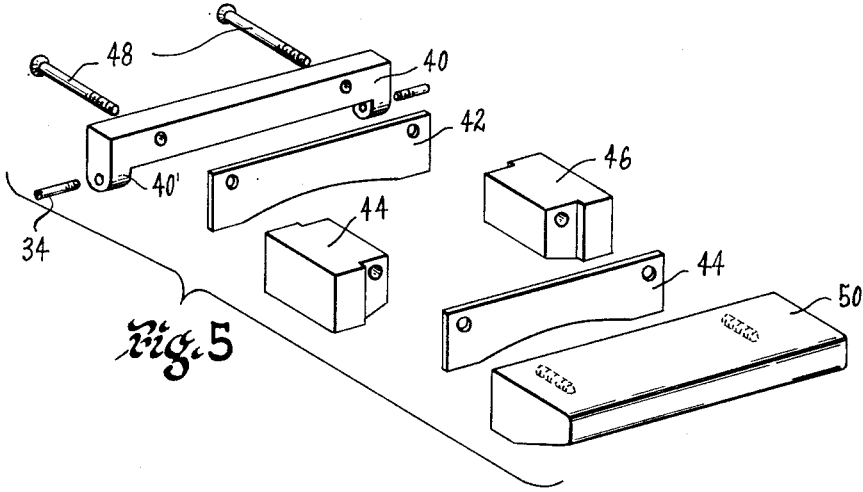
Fig. 5 is a perspective exploded view of the cover assembly of Fig. 1.

The cover may be made as one single machined part but preferably is a built-up assembly which comprises, in the preferred construction as shown by Figs. 1, 2 and 3 and in details in Fig. 5, a side bar 40 having downwardly extending projections 40' adjacent opposite ends thereof. These projections are provided with aligned openings for receiving the pintles 34 and are so shaped as to allow a hinging action of the bar 40 relative to the gate assembly 11 and the lower side bar 28 thereof. A pair of confining guide rails 42 and 44 are provided to overlie the guide rails 20 and 22 and are held in spaced relation by an upper pair of spacing blocks 44 and 46. These blocks are of such size and so spaced from each other as to form between the guide rails and the spacing blocks a rectangular opening aligned with the projection aperture 16 when a pair of securing screws or bolts 48 are extended through these members and into a threaded side bar 50 which is preferably of relatively heavy material. The side bar 50 serves as means to normally hold the cover assembly in closed position overlying the gate assembly and the guideway 36. Thus, slight movement of the cover assembly is allowed when required during travel of a thick portion of film strip through the gate.

Normally, the several parts constituting the cover assembly will be accurately finished and then assembled and secured in place by the screws or bolts 48 after which the guide rails of the lower gate assembly may be adjusted vertically toward the confining guide rails 42—44 and into an exact predetermined spaced relation relative thereto, preferably formed by a strip of film, or the like, of exact thickness desired positioned therebetween after which the clamping bolts 32 and 33 may be tightened clamping the parts to spacing blocks 14 and 15.

In the film gate construction shown, the bottom surfaces of the spacing blocks 14 and 15 are grooved in the general direction of travel of the film as indicated at 52, the purpose for such grooves being to accommodate upwardly pressed ball detents (not shown) or the like, for maintaining the entire gate construction including the gate assembly and cover assembly in a central position relative to the optical axis of a projector as well as for allowing a lateral shifting of the gate equal amounts of either side of such central position when desired. For example, when such a film gate is being employed with an objective of relatively high magnification it may be desirable to shift the gate as well as the film in order that all portions of an individual frame may be aligned therewith for projection purposes. In order to allow such lateral shifting of the film gate and still have the gate assembly stay in place relative to the projection apparatus, there are provided in the side bars of the gate assembly cylindrical rods 54 and 56 which are intended to extend into or through aligned openings in the projector housing. This will normally prevent upward movement of the gate assembly but allow sidewise shifting of the film and gate. The forward rod 54 is provided with a handle 58 for facilitating such shifting of the film gate.

If reference is made to Fig. 7 it will be seen that the pintle or pivot means 34 for the cover assembly is located above a horizontal plane passing through the guideway 36 at the center of the gate. This is so that the cover assembly may be swung upwardly readily without having overlapping lip or edge portions of the cover assembly bind and interfere with part of the gate assembly during such pivotal action. To further assure that the gate and cover assemblies are normally maintained in proper operative relationship during movement of strip film therethrough, notwithstanding the fact that at times a poor or very thick splice moving rapidly through the gate may strike the cover assembly and cause same to fly upwardly, a pin 60 is provided centrally in the forward bar 50 of the cover assembly and has its lower end portion arranged to extend downwardly into a tapered recess 62 provided therefor in the forward side bar of the gate assembly 12.

Fig. 8 shows a group of side rail members, like 20 and 22, which may be individually blanked, finished to proper thickness, heat treated and then clamped together for a final grinding and polishing of the upper surfaces 63 thereon to the exact compound curvature desired, not only to accommodate near the centers thereof the film contacting curve 63' required but also the rounded end portions 63". Pairs of oversized holes are shown in each end of each side rail and preferably these will be formed before hardening of the rails. In somewhat similar manner a group of blocks 14 and 15 may be clamped together and simultaneously ground to form surfaces 18 and thereafter reversed to form surfaces 19 of exact spacing relation thereto.

Figure 9:
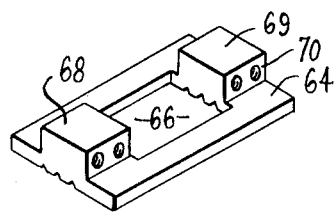
Fig. 9 is a modification of a part of the structure of Fig. 1.

In Fig. 9 a slightly different modification is shown. The spacing and supporting means for the lower gate assembly may comprise a main supporting member 64 having a central projection aperture 66 formed therein and being provided at opposite sides of this aperture with upstanding projections 68 and 69 having on opposite edge portions thereof accurately spaced abutment surfaces 70 in parallel relation to each other. These projections are provided with threaded openings for receiving the clamping screws in a manner similar to that employed in the blocks 14 and 15 of Fig. 1. While a little more room is required in the axial direction in a projector for accommodating a film gate having such a main supporting member such might, nevertheless, be desirable at times. It should be evident, however, that in such a construction after the guide rails and side bars have been loosely secured to opposite sides of these upstanding projections 68 and 69 these guide rails may be moved vertically toward the cover plate or assembly employed therewith and into exact predetermined spaced relation with respect to the confining guide rails 42 and 44 thereon by access through the projection aperture 66 thereof.

While as much as 15 mm. may be possible in width of picture area on a 16 mm. film accommodated by a film gate of the present construction, a preferred spacing between film guiding rails for this size film is approximately 14 mm. with a thickness of each rail being approximately one millimeter or slightly more. Obviously, similar proportions may be employed for film gates following the teachings of the present invention but adapted for use with other different standard widths of film.

Having described my invention, I claim:

1. A projector film gate construction comprising a gate assembly and cover means carried thereby, said gate assembly comprising means for positioning said gate assembly in operative position upon a projector, or the like, and including a pair of spacing blocks disposed in spaced relation to each other so as to accommodate a projection aperture therebetween, said spacing blocks having accurately spaced abutment surfaces formed on opposite sides thereof, a pair of plate-like guide rails of accurately controlled thickness disposed in spaced substantially parallel relation at opposite sides of said spacing blocks so as to accommodate said projection aperture therebetween, a pair of side bars located outwardly of said guide rails and having side wall portions thereon for confining strip film of a predetermined size when located therebetween against any appreciable lateral displacement, and means for securing said side bars to said spacing blocks and for clamping said guide rails therebetween, said guide rails having accurately formed film-guiding surfaces of predetermined curvature thereon.

2. A projector film gate assembly comprising means for positioning said gate assembly in operative position upon a projector, or the like, said means including a pair of spacing blocks disposed in normally fixed spaced relation to each other so as to accommodate a projection aperture therebetween, said spacing blocks having accurately spaced abutment surfaces formed on opposite sides thereof, a pair of plate-like guide rails of accurately controlled thickness disposed in spaced substantially parallel relation at opposite sides of said spacing blocks so as to accommodate said projection aperture therebetween, a pair of side bars located outwardly of said guide rails for confining strip film of a predetermined size when located therebetween against any appreciable lateral displacement, and means for securing said side bars to said spacing blocks and for clamping said guide rails therebetween, said guide rails being detachable from said spacing blocks and having accurately formed film-guiding surfaces of predetermined curvature formed thereon.

3. A projector film gate construction comprising a gate assembly and cover carried thereby, said gate assembly comprising means for positioning said gate assembly in operative position upon a projector, or the like, and including a pair of spacing blocks disposed in spaced relation to each other so as to accommodate a projection aperture therebetween, said spacing blocks having accurately spaced abutment surfaces formed on opposite sides thereof, a pair of plate-like guide rails of accurately controlled thickness disposed in spaced substantially parallel relation at opposite sides of said spacing blocks so as to accommodate said projection aperture therebetween, a pair of side bars located outwardly of said guide rails and having side wall portions thereon for confining strip film of a predetermined size when located therebetween against any appreciable lateral displacement, means for securing said side bars to said spacing blocks and for clamping said guide rails therebetween, said guide rails having accurately formed film-guiding surfaces of predetermined curvature thereon, and means pivotally connecting said cover to one of said side bars so as to allow upward movement of said cover relative to said gate assembly for insertion of strip film therebetween.

4. A projector film gate construction comprising a gate assembly and a cover assembly carried thereby, said gate assembly comprising means for positioning said gate assembly in operative position upon a projector, or the like, and including a pair of spacing blocks disposed in spaced relation to each other so as to accommodate a projection aperture therebetween, said spacing blocks having accurately spaced abutment surfaces formed on opposite sides thereof, a pair of lower plate-like guide rails of accurately controlled thickness disposed in spaced substantially parallel relation at opposite sides of said spacing blocks so as to accommodate said projection aperture therebetween, a pair of side bars located outwardly of said guide rails and having side wall portions thereon for confining strip film of a predetermined size when located therebetween against any appreciable lateral displacement, means for securing said side bars to said spacing blocks and for clamping said guide rails therebetween, said lower guide rails having accurately formed film-guiding surfaces of predetermined curvature thereon, said cover assembly comprising spacing blocks and a pair of upper film-confining guide rails secured thereto so as to be in predetermined spaced relation to each other, and means on said cover assembly engaging said gate assembly so as to normally position said confining guide rails in position directly above and in predetermined spaced relation to said lower guide rails during use thereof.

5. A projector film gate construction comprising a gate assembly and cover means carried thereby, said gate assembly comprising means for positioning said gate assembly in operative position upon a projector, or the like, and including a pair of spacing blocks disposed in spaced relation to each other so as to accommodate a projection aperture therebetween, said spacing blocks having accurately spaced abutment surfaces formed on opposite sides thereof, a pair of lower plate-like guide rails of accurately controlled thickness disposed in spaced substantially parallel relation at opposite sides of said spacing blocks so as to accommodate said projection aperture therebetween, a pair of side bars located outwardly of said guide rails and having side wall portions thereon for confining strip film of a predetermined size when located therebetween against any appreciable lateral displacement, means for securing said side bars to said spacing blocks and for clamping said guide rails therebetween, said lower guide rails having accurately formed film-guiding surfaces of predetermined curvature thereon, said cover means comprising spacing blocks and a pair of upper film-confining guide rails removably secured thereto so as to be in predetermined spaced relation to each other, and means for hingedly securing said cover means to a side bar of said gate assembly with said confining guide rails disposed directly above and in predetermined spaced relation to said lower guide rails.

RICHARD M. GILE.

No references cited.